United States Patent Office 3,020,145
Patented Feb. 6, 1962

3,020,145
HERBICIDAL COMPOSITION AND METHOD EMPLOYING SUBSTITUTED UREAS
Richard J. Gobeil, Rayner S. Johnson, and Raymond W. Luckenbaugh, Wilmington, Del., assignors to E. I. du Pont de Nemours and Company, Wilmington, Del., a corporation of Delaware
No Drawing. Filed Dec. 22, 1955, Ser. No. 554,618
7 Claims. (Cl. 71—2.6)

This invention relates to herbicidal compositions and methods. More particularly, it relates to herbicidal compositions and methods which employ as an essential herbicidal ingredient one or more members of a class of carbamido alkanoic acids or certain derivatives thereof.

The carbamido alkanoic acids employed in the herbicidal compositions and methods of the invention are characterized by containing the following structure (1) 

where A represents a bivalent saturated aliphatic hydrocarbon radical containing less than 5 carbon atoms (i.e., ethylene, methylene, trimethylene, tetramethylene, ethylidene, a propylidene, and a butylidene) and are further characterized by having one of the nitrogen valence bonds shown in the formula attached to methyl, another of the nitrogen valence bonds attached to phenyl or one of a specified group of substituted phenyl radicals and the remaining nitrogen valence bond attached to hydrogen or an alkyl or alkenyl radical containing less than 6 carbon atoms.

More specifically, the herbicidal compositions and methods of the invention are those which employ as an essential active ingredient a compound selected from the group consisting of the carbamido alkanoic acids represented by the formulas (2) 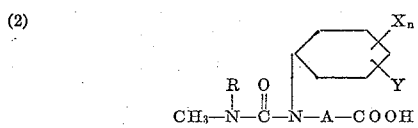

and (3) 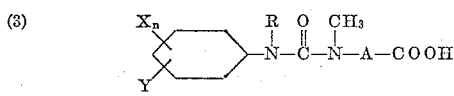

where A, as defined above, is a bivalent saturated aliphatic hydrocarbon radical containing less than 5 carbon atoms, R is selected from the group consisting of hydrogen, alkyl containing less than six carbon atoms and alkenyl containing less than 6 carbon atoms, X and Y are selected from hydrogen, halogen, and alkyl containing less than 5 carbon atoms, and $n$ is a positive integer less than 3 (i.e., one or two), the aromatic substituent having hydrogen on at least one of the nuclear carbons ortho to the nuclear carbon to which the urea nitrogen atom is linked (in other words, the benzene nucleus should not contain substituents, other than hydrogen, in both ortho positions); and the salts, esters, and amides of said carbamido alkanoic acids.

For convenience, the class of compounds defined and discussed above will be referred to in a generic sense more briefly as carbamidocarbonyl compounds.

The preferred halogen substituent in the carbamidocarbonyl compounds is chlorine. The preferred alkyl or monovalent aliphatic radical substituent is methyl or ethyl, most preferably methyl. And A, in the above formulas, is most preferably methylene in which extent the compounds can be named as hydantoic acids or derivatives thereof.

The herbicidal compositions of the invention are particularly effective because of the unique property of the carbamidocarbonyl compounds to translocate in plants after application of the compositions to the foliage of the unwanted plant. Particularly preferred for this unique property are compounds of Formula 3 in which A is —$CH_2$—.

Various methods can be used to prepare carbamidocarbonyl compounds used in the herbicidal compositions and methods of the invention. For example, the esters of the acids represented by Formula 3 above in which R is hydrogen are conveniently prepared by reacting a carbalkoxyalkyl methylamine with a phenyl isocyanate in equimolar amounts as shown in the following equation which illustrates the process with respect to specific reactants:

(4) 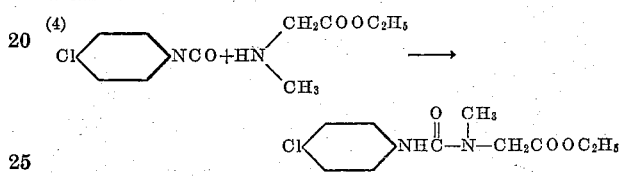

The process of the kind illustrated by Equation 4 is suitably carried out by adding the amine reactant gradually to an agitated solution of the phenyl isocyanate in an inert solvent such as xylene, toluene, or dioxane. The reaction is suitably carried out at a temperature in the range of about 50° to 75° C. No catalyst is needed.

The alkaline earth and alkali metal salts of acids represented by Formula 3 above in which R is hydrogen are obtained by a modification of the process described above. An aqueous solution of the carboxyalkyl methylamine with the alkaline earth or alkali metal hydroxide is brought together with an acetone solution of the phenyl isocyanate reactant with stirring. Ordinarily, some 1,3-bisarylurea is formed and this is filtered and the filtrate evaporated to dryness whereupon the metal salt is obtained usually in the form of a hydrate. The free acids are readily obtained by acidifying metal salts so obtained.

Esters of the acids represented by Formula 3 above in which R is an alkyl or alkenyl radical are prepared by first reacting phosgene with an aniline reactant in an inert solvent, followed by heating to reflux until evolution of hydrogen chloride ceases. The resulting solution of the carbamyl chloride is reacted with the desired secondary amine in equimolar amounts in the presence of an acid acceptor such as triethylamine. The following equations, showing specific reactants, illustrate the process:

(5) 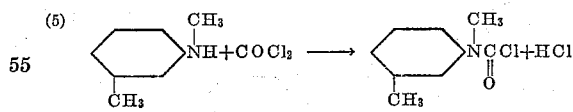

and (5a) 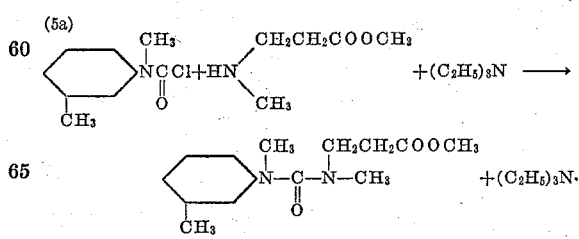

The procedure described above can be used to prepare esters of acids represented by Formula 2 above in which R is a monovalent aliphatic hydrocarbon radical and A, as defined above, is a bivalent saturated aliphatic hydrocarbon radical, by using the appropriate substituted aniline.

(6)
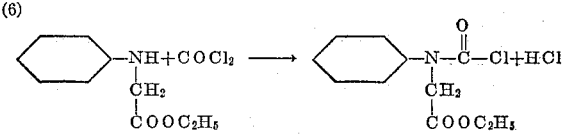

and (6a)
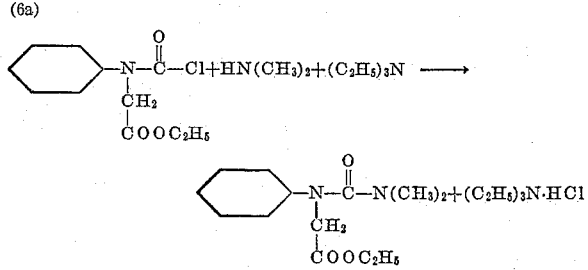

The compounds described in Formula (2) can also be prepared by treating an anhydrous toluene solution of the sodium salt of an appropriate substituted urea with the corresponding haloalkylcarboxylic acid ester at 70°–75° C. After heating for about six hours at this temperature, the product is isolated from the filtrate by evaporation of the toluene.

(7)
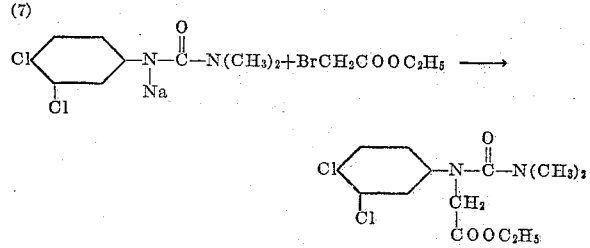

The free acids or salts of compounds of the type described in Equations (5a), (6a), and (7) can be prepared by hydrolyzing the ester with an equivalent of an alkaline hydroxide in an aqueous solution. The resultant solution is extracted with chloroform to remove traces of unreacted ester or by-product aniline. The solution of the corresponding alkaline salt can be evaporated to dryness to obtain the salt or, if desired, the solution acidified to obtain the free acid. The following equation illustrate:

(8)
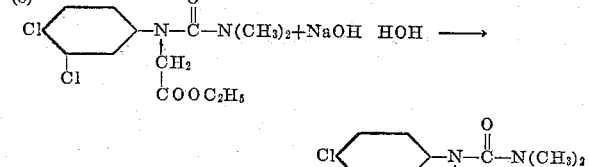

(8a)
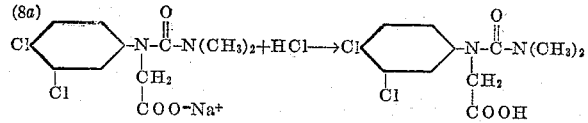

The amides of the compounds of Formulas 2 and 3 may be prepared by treatment of the free acids with an equivalent of thionyl chloride in dry toluene is warmed gently 40–45° until one equivalent of hydrogen chloride is evolved. By addition of ammonia gas to the solution the amide is obtained.

(9)
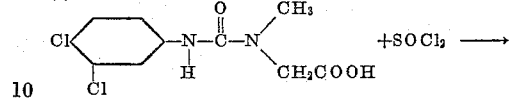
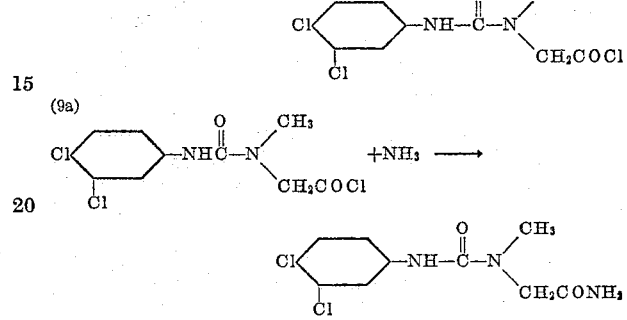

(9a)

Except for the esters, some of which are viscous liquids, the carbamidocarbonyl compounds employed in the herbicidal formulations and methods of the invention are in general white crystalline solids. The metal salts are water soluble but the other carbamidocarbonyl compounds are generally water insoluble and differ with respect to the solubility and the common organic solvents, some such as the esters being generally quite soluble and others such as the acids generally having low solubility.

Herbicidal compositions of the invention are prepared by admixing one or more of the carbamidocarbonyl compounds defined heretofore, in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids, preferably talcs, natural clays, pyrophyllite, diatomaceous earth or flours such as walnut shell, wheat, redwood, soya bean, cottonseed flours and other inert solid conditioning agents or carriers of the kind conventionaly employed in preparing pest control compositions in dust or powdered form.

Liquid compositions of the invention are prepared in the usual way by admixing one or more of the carbamidocarbonyl compounds with a suitable liquid diluent media. With certain solvents such as alkylated naphthalene, dimethylformamide, and cresol, relatively high, up to about 35% by weight or more, concentrations of the carbamidocarbonyl compounds can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active dispersing agents cause the compositions to be easily dispersed in water to give aqueous sprays which for the most part constitute a desirable composition for application.

The surface-active dispersing agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in detail in articles by McCutcheon in "Soap and Sanitary Chemicals," August, September, and October of 1949.

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays but can also be applied as sprays directly to the surface of the soil. Alternatively, the dried powdered compositions can be dusted directly on the plants or on the soil.

The active compound is, of course, applied in amount sufficient to exert the desired herbicidal action. The amount of the active carbamidocarbonyl compound present in the compositions as actually applied for destroying, preventing or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of a carbamidocarbonyl compound or a combination of carbamidocarbonyl compounds.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate methods for making carbamidocarbonyl compounds, herbicidal formulations employing such compounds, herbicidal applications, and the results obtained. Parts are by weight unless otherwise specified and the numbers following tabulated ingredients in the examples represent parts by weight of the ingredients in the combination shown in such tabulation.

*Example 1*

A total of 19.6 parts of β-carbethoxyethyl methylamine in 50 parts of xylene is gradually added over a thirty minute period to an agitated solution of 23 parts of p-chlorophenyl isocyanate in xylene. The reaction mass is agitated for an additional hour at about 25° C. and then diluted with n-penetne. There is obtained an 89% yield, the product N-(p-chlorophenylcarbamoyl)-N-methyl-β-alanine, ethyl ester, M.P. 86–87.5° C.

*Analysis.*—Calc'd for $C_{13}H_{17}ClN_2O_3$: N, 9.84%. Found: N, 9.84%.

The carbamidocarbonyl compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| N - (p - chlorophenylcarbamoyl) - N - methyl-β-alanine, ethyl ester | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active carbamidocarbonyl compound which is applied at a dosage of 10 pounds of the carbamidocarbonyl compound per acre to kill Johnson grass and other unwanted plants.

*Example 2*

A total of 13.1 parts of β-carbethoxymethylamine is added gradually over a thirty minute period to an agitated solution of 13.3 parts of m-tolylisocyanate in 200 parts of xylene, the temperature increasing during this addition period to about 40° C. Agitation is continued for another hour and the xylene solvent is then removed by heating under vacuo. There is obtained a 93% yield, the product N-methyl-N-(m-tolylcarbamoyl)-β-alanine, ethyl ester, an oily liquid $n_D^{25}$ 1.5380.

*Analysis.*—Calc'd for $C_{14}H_{20}N_2O_3$: N, 10.61. Found: N, 11.31%.

The compound prepared as above is formulated in a liquid or fluid composition shown below by thoroughly mixing and dispersing the compound and the conditioning agents in the organic diluent.

| | |
|---|---|
| N - methyl - N - (m - tolylcarbamoyl) - β - alanine, ethyl ester | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

*Example 3*

Gaseous hydrogen chloride is bubbled into an agitated solution of 10 parts of 1-(cyanomethyl)-1-methyl-3-(m-tolyl) urea in 75 parts of methanol. The reaction is exothermic and the solution warms to reflux temperature as the hydrogen chloride is added and ammonium chloride by-product precipitates. The solution is saturated with hydrogen chloride and then heated at reflux temperature for one hour. Ammonium chloride is removed by filtration. The filtrate evaporated to dryness and then is extracted with benzene from which extract there is obtained a 1-(carbmethoxymethyl)-1-methyl-3-(m-tolyl) urea, M.P. 57.5–60.5° C.

The compound prepared as above is formulated in a powdered composition adapted for use in the preparation of a spray using either an oil, water, or a combinaiton of oil and water as a liquid diluent. The powdered composition is made by conventional mixing and grinding operations.

| | |
|---|---|
| 1-(carbmethoxymethyl)-1-methyl-3-(m-tolyl) urea | 70 |
| Alkylated aryl polyether alcohol (wetting and dispersing agent) | 4 |
| Fuller's earth | 26 |
| | 100 |

The dispersible powdered composition of this example is admixed with an oil and water to give a spray composition containing one part of the powdered composition, 80 parts of water, and 20 parts of alkylated naphthalene. The resulting spray composition is applied at the rate of 100 gallons per acre to a field planted with corn, but prior to emergence of the corn, to control weed infestation of the area.

*Example 4*

A solution of 9 parts of sarcosine in 150 parts of water is diluted with a solution of 4 parts of sodium hydroxide in 40 parts of water. A solution of 15.4 parts of p-chlorophenyl isocyanate in 20 parts of dry acetone is added slowly with vigorous agitation to the alkaline sarcosine solution over a ten-minute period. The mixture is then stirred for one hour at about room temperature. 1,3-bis-(p-chlorophenyl)urea which precipitates is removed by filtration. The filtrate is evaporated to dryness and there is obtained 24.5 parts of 5-(p-chlorophenyl)-3-methylhydantoic acid, sodium salt monohydrate, a compound which softens at about 128° C. and hardens to form a glossy mass.

*Analysis.*—Calc'd for $C_{10}H_{10}N_2O_3ClNa \cdot H_2O$: N, 9.91%; $H_2O$, 6.37%. Found: N, 9.91%; $H_2O$, 6.4%.

The compound prepared as above is formulated in a dust composition adapted for direct application as a dust. The dust is made by blending or mixing the ingredients shown below and grinding the mix to give a composition having an average particle size less than about 50 microns.

5-(p-chlorophenyl)-3-methylhydantoic acid, sodium
  salt monohydrate _____ 20
Talc _____ 80
                                                 ———
                                                 100

The dust formulation of this example is applied using a conventional dusting apparatus at a dosage of 100 pounds per acre of the composition to a drainage ditch to kill and inhibit regrowth of weeds.

*Example 5*

5-(3,4-dichlorophenyl)-3-methylhydantoic acid, sodium salt monohydrate, M.P. 142–147° C. is obtained in 87% yield by practicing the process of Example 4 in which the p-chloroisocyanate of that example is replaced by 3,4-dichlorophenylisocyanate.

*Analysis.*—Calc'd for $C_{10}H_9Cl_2N_2O_3Na \cdot H_2O$: N, 8.83%. Found: N, 8.98%.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

5-(3,4-dichlorophenyl)-3-methylhydantoic acid, sodium salt monohydrate_____ 10
Goulac (dispersing agent)_____ 3
Hydrocarbon oil _____ 1
Dextrin (binding agent)_____ 20
Fuller's earth _____ 66
                                                  ———
                                                  100

The herbicidal composition of this example is applied by means of a fertilizer spreader apparatus at a rate of 10 lbs./acre of the granular formulation to a field planted with cottonseed, the application being made prior to emergence of the cotton plants, to control weed growth in the planted field.

*Example 6*

3-methyl-5-phenylhydantoic acid, sodium salt monohydrate, M.P. >300° C., is prepared according to the procedure of Example 4 by merely substituting the p-chlorophenyl isocyanate reactant of that example with phenyl isocyanate.

The compound of this example is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

3-methyl-5-phenylhydantoic acid, sodium salt monohydrate _____ 80
Sodium disulfonate of dibutyl phenylphenol (wetting
  and dispersing agent)_____ 2
Bentonite_____ 18
                                                 ———
                                                 100

The water dispersible powdered composition described above is dispersed in water to give an aqueous spray composition containing 0.6% by weight of the active carboxyalkylurea which is applied at a dosage of 4 pounds of said urea per acre as a pre-emergence spray to crop land planted with corn to prevent infestation of the planted area with broad leafed weeds and grasses.

*Example 7*

To a solution of 22 parts of phosgene in 200 parts of xylene there is added gradually a solution of 35.8 parts of N-phenylglycine, ethyl ester in 25 parts of xylene.

The resulting mixture is heated at about reflux temperature for 4 hours.

After allowing the reaction mass to stand at about room temperature for approximately 17 hours, 25.5 parts of triethylamine is added to the solution and then while agitating, 12.4 parts of dimethylammonium carbonate is gradually added. Considerable foaming occurs during this latter addition.

Triethylamine hydrochloride formed in this process is removed by filtration and the filtrate is evaporated to dryness in vacuum at a pressure <1 mm. Hg. There is obtained a 64% yield, the liquid product 3-phenyl-5,5-dimethylhydantoic acid, ethyl ester, $n_D^{33}$ 1.5228.

*Analysis.*—Calc'd for $C_{13}H_{18}N_2O_3$: N, 11.2%. Found: N, 10.83%.

The compound prepared as above is formulated in a dust composition adapted for direct application as a dust. The dust is made by blending or mixing the ingredients shown below and grinding the mix to give a composition having an average particle size less than about 50 microns.

3-phenyl-5,5-dimethylhydantoic acid, ethyl ester____ 5
Cottonseed oil_____ 4
Walnut shell flour_____ 91
                                                 ———
                                                 100

The dust formulation of this example is applied using a conventional dusting apparatus at a dosage of 15 pounds per acre of carboxyalkyl urea to prevent growth of weeds for an extended period.

*Example 8*

By the same procedure as outlined in Examples 1 and 2, N-methyl-N-(phenylcarbamoyl)-β-alanine, ethyl ester (M.P. 43–44° C.) is prepared in 92% yield from β-carbethoxyethyl methylamine and phenyl isocyanate.

*Analysis.*—Calc'd for $C_{13}H_{18}O_3N_2$: N, 11.20. Found N, 11.31.

The carbamidocarbonyl compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---:|
| N-methyl - N - (phenylcarbamoyl)-β-alanine, ethyl ester | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active carbamidocarbonyl compound which is applied at a dosage of 10 pounds of the carbamidocarbonyl compound per acre to kill Johnson grass and other unwanted plants.

Example 9

5-(3,4-dichlorophenyl)-3-methylhydantoic acid, ethyl ester (M.P. 114–115° C.) is prepared in 90% yield by the method described in Example 1 from ethylsarcosinate and 3,4-dichlorophenyl isocyanate.

*Analysis.*—Calc'd for $C_{12}H_{14}O_3N_2Cl$: Cl, 23.2. Found: Cl, 23.22.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 5-(3,4-dichlorophenyl)-3-methylhydantoic acid, ethyl ester | 20 |
| Talc | 80 |
| | 100 |

The dust formulation of this example is applied using a conventional dusting apparatus at a dosage of 100 pounds per acre of the composition to a drainage ditch to kill and inhibit regrowth of weeds.

Example 10

By the same procedure as outlined in Example 4, an aqueous solution of 5-(p-chlorophenyl)-3-methylhydantoic acid, sodium salt is prepared. This solution is acidified with 10% aqueous hydrogen chloride. The resultant precipitate is filtered and dried. There is obtained 15 parts of 5-(p-chlorophenyl)-3-methylhydantoic acid, M.P. 140–141° C.

*Analysis.*—Calc'd for $C_{10}H_{11}ClN_2O_3$: N, 11.5; Cl, 14.6. Found: N, 11.27; Cl, 14.69.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---:|
| 5-(p-chlorophenyl)-3-methylhydantoic acid, sodium salt | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied by means of a fertilizer spreader apparatus at a rate of 10 lbs./acre of the granular formulation to a field planted with cottonseed, the application being made prior to emergence of the cotton plants, to control weed growth in planted field.

Example 11

5-(3,4-dichlorophenyl)-3-methylhydantoic acid is prepared by a procedure like that of Example 10. The product is obtained in 80% yield, M.P. 155–158° C.

*Analysis.*—Calc'd for $C_{10}H_{10}Cl_2N_2O_3$: N, 10.2. Found: N, 10.13.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 5-(3,4-dichlorophenyl)-3-methylhydantoic acid | 20 |
| Talc | 80 |
| | 100 |

The dust formulation of this example is applied using a conventional dusting apparatus at a dosage of 100 pounds per acre of the composition to a drainage ditch to kill and inhibit regrowth of weeds.

Example 12

By the same procedure outlined in Example 7, a solution of N - (3,4 - dichlorophenyl) - N-methylcarbamyl chloride is prepared from N-methyl-3,4-dichloroaniline. When this solution is treated with the ethyl ester of sarcosine in the presence of triethyl amine, 5-(3,4-dichlorophenyl)-3,5-dimethylhydantoic acid, ethyl ester, is obtained in 85% yield as a clear viscous oil, $n_D^{26}$ 1.5480

*Analysis.*—Calc'd for $C_{13}H_{16}Cl_2N_2O_3$: N, 8.8; Cl, 22.3. Found: N, 8.30; Cl, 22.08.

The compound prepared as above is formulated in a liquid or fluid composition shown below by thoroughly mixing and dispersing the compound and the conditioning agents in the organic diluent.

| | |
|---|---:|
| 5 - (3,4 - dichlorophenyl) 3,5 - dimethylhydantoic acid ethyl ester | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

Example 13

A total of 116.5 parts of 3-(3,4-dichlorophenyl)1,1-dimethylurea is combined with 1000 parts of toluene and distilled through a packed column until constant head temperature is reached to remove all water. The mixture is cooled and 28.4 parts of sodium methylate is added, and the mixture distilled until constant temperature is again reached.

After cooling the remaining liquid to 75° C., 87.6 parts of bromoethyl acetate is added gradually. After agitating for six hours at 70–75° C., the reaction mixture is cooled and filtered. The toluene is evaporated from the filtrate, the residue dissolved in ether, washed with water, dried over anhydrous magnesium sulfate, and then evaporated in vacuum.

There is obtained 75 parts of 3-(3,4-dichlorophenyl)-5,5-dimethylhydantoic acid, ethyl ester, an orange oil, $n_D^{25}$ 1.5460.

*Analysis.*—Calc'd for $C_{13}H_{16}Cl_2N_2O_3$: C, 48.91; H, 5.01. Found: C, 47.35; H, 4.90.

The compound prepared as above is formulated in a liquid or fluid composition shown below by thoroughly mixing and dispersing the compound and the conditioning agents in the organic diluent.

| 3 - (3,4 - dichlorophenyl) - 5,5 - dimethylhydantoic acid, ethyl ester | 25 |
|---|---|
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

Example 14

A mixture of 20 parts of 3-(3,4-dichlorophenyl)-5,5-dimethylhydantoic acid, ethyl ester, 100 parts of water and 3 parts by weight of sodium hydroxide is stirred for 24 hours at room temperature. The mixture is extracted twice with chloroform and the aqueous layer acidified with dilute hydrogen chloride. The solid which separated is purified by recrystallization from ether and n-pentane. The pure 3-(3,4-dichlorophenyl)-5,5-dimethylhydantoic acid product obtained melts at 179.5–181.5° C.

*Analysis.*—Calc'd for $C_{11}H_{12}Cl_2N_2O_3$: N, 9.62; N.E. 291. Found: N, 9.39; N.E. 291.

The compound prepared as above is formulated in a powdered composition adapted for use in the preparation of a spray using either an oil, water, or a combination of oil and water as a liquid diluent. The powdered composition is made by conventional mixing and grinding operations.

| 3 - (3,4 - dichlorophenyl) - 5,5 - dimethylhydantoic acid | 70 |
|---|---|
| Alkylated aryl polyether alcohol (wetting and dispersing agent) | 4 |
| Fuller's earth | 26 |
| | 100 |

The dispersible powdered composition of this example is admixed with an oil and water to give a spray composition containing one part of the powdered composition, 80 parts of water, and 20 parts of alkylated naphthalene. The resulting spray composition is applied at the rate of 100 gallons per acre to a field planted with corn, but prior to emergence of the corn, to control weed infestation of the area.

Example 15

When 1.45 parts of 3 - (3,4-dichlorophenyl)-5,5-dimethylhydantoic acid is combined with 20 parts of a 0.025 molar solution of aqueous sodium hydroxide and agitated for one hour a solution is obtained. This solution is diluted with two volumes of ethyl alcohol and then the entire solution is evaporated to dryness under reduced pressure to give 3-(3,4-dichlorophenyl-5,5-dimethylhydantoic acid, sodium salt.

*Analysis.*—Calc'd for $C_{11}H_{11}Cl_2N_2O_3Na$: N, 8.94; N.E. 313. Found: N, 8.46; N.E. 318.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| 3 - (3,4 - dichlorophenyl) - 5,5 - dimethylhydantoic acid, sodium salt | 10 |
|---|---|
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied by means of a fertilizer spreader apparatus at a rate of 10 lbs./acre of the granular formulation to a field planted with cottonseed, the application being made prior to emergence of the cotton plants, to control weed growth in the planted field.

Example 16

3,4-xylylisocyanate is reacted with an equimolar quantity of β-carbmethoxyethylmethylamine according to the method described in Example 1 to yield N-methyl-N-(3,4-xylylcarbamoyl)-β-alanine, methyl ester.

The carbamidocarbonyl compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| N-methyl-N-(3,4-xylylcarbamoyl)-β-alanine, methyl ester | 75 |
|---|---|
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active carbamidocarbonyl compound which is applied at a dosage of 10 pounds of the carbamidocarbonyl compound per acre to kill Johnson grass and other unwanted plants.

Example 17

Phenylisocyanate is reacted with β-carbmethoxyethylmethylamine in equimolar portions according to the method described in Example 1 to yield N-methyl-N-(phenylcarbamoyl)-β-alanine, methyl ester.

The compound prepared as above is formulated in a liquid or fluid composition shown below by thoroughly mixing and dispersing the compound and the conditioning agents in the organic diluent.

| N-methyl-N-(phenylcarbamoyl)-β-alanine, methyl ester | 25 |
|---|---|
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

Example 18

Phenylisocyanate is reacted with β-carbbutoxyethyl methylamine is equimolar proportions according to the method described in Example 1 to yield N-methyl-N-(phenylcarbamoyl)-β-alanine, butyl ester.

The compound prepared as above is formulated in a powdered composition adapted for use in the preparation of a spray using either an oil, water, or a combination of oil and water as a liquid diluent. The powdered composion is made by conventional mixing and grinding operations.

| | |
|---|---|
| N-methyl-N-(phenylcarbamoyl)-β-alanine, butyl ester | 70 |
| Alkylated aryl polyether alcohol (wetting and dispersing agent) | 4 |
| Fuller's earth | 26 |
| | 100 |

The dispersible powdered composition of this example is admixed with an oil and water to give a spray composition containing one part of the powdered composition, 80 parts of water, and 20 parts of alkylated naphthalene. The resulting spray composition is applied at the rate of 100 gallons per acre to a field planted with corn, but prior to emergence of the corn, to control weed infestation of the area.

*Example 19*

3,4-dichlorophenylisocyanate is reacted with 5-methylaminovaleric acid, methyl ester in equimolar proportions according to the method described in Example 1 to yield 5 - [3 - (3,4 - dichlorophenyl) - 1 - methylureido]valeric acid, methyl ester.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 5 - [3 - (3,4 - dichlorophenyl) - 1 - methylureido]-valeric acid, methyl ester | 20 |
| Talc | 80 |
| | 100 |

The dust formulation of this example is applied using a conventional dusting apparatus at a dosage of 100 pounds per acre of the composition to a drainage ditch to kill and inhibit regrowth of weeds.

*Example 20*

The procedure as described in Example 4 is followed, substituting 6.6 parts of potassium hydroxide (85% pure) for the sodium hydroxide of that example, to prepare 5-(p-chlorophenyl)-3-methylhydantoic acid, potassium salt.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---|
| 5-(p-chlorophenyl)-3-methylhydantoic acid, potassium salt | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied by means of a fertilizer spreader apparatus at a rate of 10 lbs./acre of the granular formulation to a field planted with cottonseed, the application being made prior to emergence of the cotton plants, to control weed growth in the planted field.

*Example 21*

When p-cumylisocyanate (16.1 parts) is used as the isocyanate in the method described in Example 4, 5-(p-cumyl)-3-methylhydantoic acid, sodium salt is obtained.

The compound of this example is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 5-(p-cumyl)-3-methylhydantoic acid, sodium salt | 80 |
| Sodium disulfonate of dibutyl phenylphenol (wetting and dispersing agent) | 2 |
| Bentonite | 18 |
| | 100 |

The water dispersible powdered composition described above is dispersed in water to give an aqueous spray composition containing 0.6% by weight of the active carboxyalkylurea which is applied at a dosage of 4 pounds of said urea per acre as a pre-emergence spray to crop land planted with corn to prevent infestation of the planted area with broad leafed weeds and grasses.

*Example 22*

A solution of the ammonium salt of 3-(3,4-dichlorophenyl)-5,5-dimethylhydantoic acid is prepared by dissolving in an equimolar quantity of concentrated ammonium hydroxide in 25 parts of water. The water is removed by evaporation to obtain the product.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 3-(3,4-dichlorophenyl)-5,5-dimethylhydantoic acid | 5 |
| Cottonseed oil | 4 |
| Walnut shell flour | 91 |
| | 100 |

The dust formulation of this example is applied using a conventional dusting apparatus at a dosage of 15 pounds per acre of carboxyalkyl urea to prevent growth of weeds for an extended period.

*Example 23*

An equimolar quantity of methylamine gas is used in the procedure described in Example 7 to react with the carbanilylchloride to prepare 5-methyl-3-phenylhydantoic acid, ethyl ester.

The carbamidocarbonyl compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 5-methyl-3-phenylhydantoic acid, ethyl ester | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active carbamidocarbonyl compound which is applied at a dosage of 10 pounds of the carbamidocarbonyl compound per acre to kill Johnson grass and other unwanted plants.

*Example 24*

An equimolar quantity of n-butylmethylamine is used in the procedure described in Example 7 to react with the carbanilylchloride to prepare 5-n-butyl-5-methyl-3-phenylhydantoic acid, ethyl ester.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 5-n-butyl-5-methyl-3-phenylhydantoic acid, ethyl ester | 20 |
| Talc | 80 |
| | 100 |

The dust formulation of this example is applied using a conventional dusting apparatus at a dosage of 100 pounds per acre of the composition to a drainage ditch to kill and inhibit regrowth of weeds.

*Example 25*

3-anilinopropionic acid, dodecyl ester (66.6 parts) is reacted as described in Example 7 to yield 3-(1-phenyl-3,3-dimethylureido)-propionic acid, dodecyl ester.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---:|
| 3-(1-phenyl-3,3-dimethylureido)-propionic acid, dodecyl ester | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied by means of a fertilizer spreader apparatus at a rate of 10 lbs./acre of the granular formulation to a field planted with cottonseed, the application being made prior to emergence of the cotton plants, to control weed growth in the planted field.

*Example 26*

5-p-chloroanilinovaleric acid, ethyl ester (51.1 parts) is reacted as dissolved in Example 7 to yield 5-[1-(p-chlorophenyl)-3,3-dimethylureido]valeric acid, ethyl ester.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 5-[1-(p-chlorophenyl)-3,3-dimethylureido]valeric acid, ethyl ester | 20 |
| Talc | 80 |
| | 100 |

The dust formulation of this example is applied using a conventional dusting apparatus at a dosage of 100 pounds per acre of the composition to a drainage ditch to kill and inhibit regrowth of weeds.

*Example 27*

A dry toluene solution 100 parts of 5-(3,4-dichlorophenyl)-3-methylhydantoic acid is warmed gently at 40–45° C. with an equimolar equivalent of thionyl chloride until one equivalent of hydrogen chloride evolves. By addition of ammonia gas to the solution, 2-[3-(3,4-dichlorophenyl)-1-methylureido]acetamide is prepared.

The compound prepared as above is formulated in a liquid or fluid composition shown below by thoroughly mixing and dispersing the compound and the conditioning agents in the organic diluent.

| | |
|---|---:|
| 2-[3-(3,4-dichlorophenyl)-1-methylureido]acetamide | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

*Example 28*

To a solution of 22 parts of phosgene in 200 parts of xylene there is added gradually a solution of 35.8 parts of N-phenylglycine, ethyl ester in 25 parts of xylene. The resultant mixture is heated at reflux temperature for four hours.

After cooling the reaction mass, 25.5 parts of triethylamine is added, and then 14.2 parts of N-methylallylamine is added gradually. The triethylamine hydrochloride is removed by filtration and 5-allyl-5-methyl-3-phenylhydantoic acid, ethyl ester is isolated by evaporation of the solvent in vacuum at a pressure of less than 1 mm. Hg.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 5-allyl-5-methyl-3-phenylhydantoic acid, ethyl ester | 5 |
| Cottonseed oil | 4 |
| Walnut shell flour | 91 |
| | 100 |

The dust formulation of this example is applied using a conventional dusting apparatus at a dosage of 15 pounds per acre of carboxyalkyl urea to prevent growth of weeds for an extended period.

*Example 29*

By the same procedure as outlined in Example 28, 5-allyl-3-(3,4-dichlorophenyl)-5-methylhydantoic acid, ethyl ester is prepared from an equal molar quantity of N-(3,4-dichlorophenyl)-glycine, ethyl ester.

The compound prepared as above is formulated in a liquid or fluid composition shown below by thoroughly mixing and dispersing the compound and the conditioning agents in the organic diluent.

| | |
|---|---:|
| 5-allyl-3-(3,4-dichlorophenyl)-5-methylhydantoic acid, ethyl ester | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

*Example 30*

By the same procedure as outlined in Example 28, 3-

(3-allyl-3-methyl-1-phenylureido) propionic acid, ethyl ester is prepared from an equal molar quantity of 3-(3,4-dichloroanilino)-propionic acid, ethyl ester.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 3-(3-allyl-3-methyl-1-phenylureido)propionic acid, ethyl ester | 5 |
| Cottonseed oil | 4 |
| Walnut shell flour | 91 |
| | 100 |

The dust formulation of this example is applied using a conventional dusting apparatus at a dosage of 15 pounds per acre of carboxyalkyl urea to prevent growth of weeds for an extended period.

*Example 31*

A solution of N-allyl-N-(3,4-dichlorophenyl)-carbamyl chloride is prepared from N-allyl-3,4-dichloroaniline by the procedure described in Example 28. When this solution is treated with the ethyl ester of sarcosine in the presence of triethylamine, 5-allyl-5-(3,4-dichlorophenyl-3-methyl hydantoic acid, ethyl ester is obtained.

The compound prepared as above is formulated in a liquid or fluid composition shown below by thoroughly mixing and dispersing the compound and the conditioning agents in the organic diluent.

| | |
|---|---|
| 5-allyl-5-(3,4-dichlorophenyl)-3-methyl hydantoic acid, ethyl ester | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the carbamidocarbonyl compound. This aqueous spray composition is sprayed on the area around oil storage tanks at a rate of 50 gallons per acre of the spray composition to destroy and control weeds.

Illustrative of other compounds which can be similarly prepared, formulated, and applied by the method described heretofore are:

N-methyl-N-(phenylcarbamoyl)-β-alanine, β-chloroethyl ester
5-(p-chlorophenyl)-3-methylhydantoic acid, butyl ester
3-methyl-5-(3,4-xylyl)hydantoic acid
5-(p-isopropylphenyl)-3-methylhydantoic acid
3-(p-chlorophenyl)-5-methylhydantoic acid
3-(-chlorophenyl)-5,5-dimethylhydantoic acid, ethyl ester
3-(3,4-dichlorophenyl)-3-n-butyl-5-methylhydantoic acid, butyl ester
5-(p-chlorophenyl)-3,5-dimethylhydantoic acid, ethyl ester
5-n-butyl-5-(3,4-dichlorophenyl)-3-methylhydantoic acid, methyl ester
N-(p-chlorophenylcarbamoyl)-N-methyl-3-methyl-β-alanine, ethyl ester
5-(3-p-chlorophenyl-1-methylureido)valeric acid
5-(1-p-chlorophenyl-3,3-dimethylureido)valeric acid
2-[1-(p-chlorophenyl)-3,3-dimethylureido]acetamide
5-(p-chlorophenyl)-3-methylhydantoic acid, salt of "Dowex" 50, a quaternary ammonium type ion exchange resin made by reaction of chloromethylated polystyrene with tertiary aliphatic amine
5-(p-chlorophenyl)-3-methylhydantoic acid, salt of "Amberlite" IR4B, weak base anion exchange resin made by the reaction of meta-phenylenediamine and formaldehyde While the invention has been described with particular reference to specific embodiments, it will be appreciated that no unnecessary limitations are to be understood therefrom. The invention is not limited to the exact details shown and described for obvious modifications will occur to those skilled in the art.

This application is a continuation in part of our co-pending application Serial No. 505,534, filed May 2, 1955, now abandoned.

We claim:

1. A method for the control of weeds which comprises applying to a locus to be protected, in amount sufficient to exert a herbicidal action, a compound selected from the group consisting of the carbamido alkanoic acids represented by the formulas

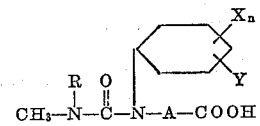

and

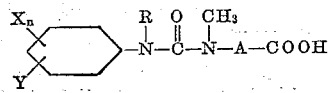

where A is a bivalent saturated aliphatic hydrocarbon radical containing less than 5 carbon atoms, R is selected from the group consisting of hydrogen, alkyl containing less than 6 carbon atoms and alkenyl containing less than 6 carbon atoms, X and Y are selected from the group consisting of hydrogen, halogen, and alkyl containing less than 5 carbon atoms, and $n$ is a positive integer less than 3, the aromatic substituent having hydrogen on at least one of the nuclear carbons ortho to the nuclear carbon to which the urea nitrogen atom is linked, and the salts, esters, and amides of said carbamido alkanoic acids.

2. A herbicidal composition comprising a material selected from the group consisting of anionic, cationic and nonionic surface active agents and, in amount sufficient to exert herbicidal action, a compound selected from the group consisting of the carbamido alkanoic acids represented by the formulas

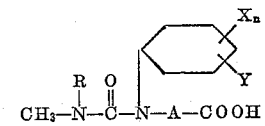

and

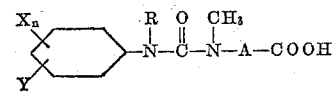

where A is a bivalent saturated aliphatic hydrocarbon radical containing less than 5 carbon atoms, R is selected from the group consisting of hydrogen, alkyl containing less than 6 carbon atoms and alkenyl containing less than 6 carbon atoms, X and Y are selected from the group consisting of hydrogen, halogen, and alkyl containing less than 5 carbon atoms, and $n$ is a positive integer less than 3, the aromatic substituent having hydrogen on at least one of the nuclear carbons ortho to the nuclear carbon to which the urea nitrogen atom is linked, and the salts, esters, and amides of said carbamido alkanoic acids.

3. A herbicidal composition comprising a material selected from the group consisting of anionic, cationic and nonionic surface active agents and, in amount sufficient to exert herbicidal action, the compound 5-(3,4-dichlorophenyl)-3-methyl hydantoic acid, sodium salt monohydrate.

4. A herbicidal composition comprising a material selected from the group consisting of anionic, cationic and nonionic surface active agents and, in amount sufficient to exert herbicidal action, the compound 3-(3,4-dichlorophenyl)-5,5-dimethyl hydantoic acid, ethyl ester.

5. A herbicidal composition comprising a material selected from the group consisting of anionic, cationic and nonionic surface active agents and, in amount sufficient to exert herbicidal action, the compound 5-(p-chlorophenyl)-3-methyl hydantoic acid, sodium salt monohydrate.

6. A herbicidal composition comprising a powdered solid inert carrier material and, in amount sufficient to exert herbicidal action, a compound selected from the group consisting of the carbamido alkanoic acids represented by the formulas

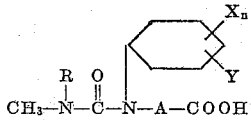

and

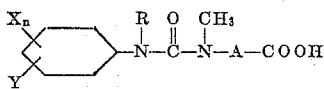

where A is a bivalent saturated aliphatic hydrocarbon radical containing less than 5 carbon atoms, R is selected from the group consisting of hydrogen, alkyl containing less than 6 carbon atoms and alkenyl containing less than 6 carbon atoms, X and Y are selected from the group consisting of hydrogen, halogen, and alkyl containing less than 5 carbon atoms, and $n$ is a positive integer less than 3, the aromatic substituent having hydrogen on at least one of the nuclear carbons ortho to the nuclear carbon to which the urea nitrogen atom is linked, and the salts, esters, and amides of said carbamido alkanoic acids.

7. A herbicidal composition comprising a hydrocarbon liquid diluent and, in amount sufficient to exert herbicidal action, a compound selected from the group consisting of the carbamido alkanoic acids represented by the formulas

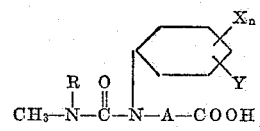

and

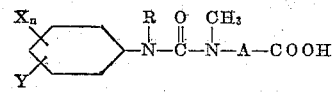

where A is a bivalent saturated aliphatic hydrocarbon radical containing less than 5 carbon atoms, R is selected from the group consisting of hydrogen, alkyl containing less than 6 carbon atoms and alkenyl containing less than 6 carbon atoms, X and Y are selected from the group consisting of hydrogen, halogen, and alkyl containing less than 5 carbon atoms, and $n$ is a positive integer less than 3, the aromatic substituent having hydrogen on at least one of the nuclear carbons ortho to the nuclear carbon to which the urea nitrogen atom is linked, and the salts, esters, and amides of said carbamido alkanoic acids.

References Cited in the file of this patent

UNITED STATES PATENTS

| | | |
|---|---|---|
| 2,572,568 | Gluesenkamp | Oct. 23, 1951 |
| 2,655,445 | Todd | Oct. 13, 1953 |
| 2,704,245 | Searle | Mar. 15, 1955 |
| 2,705,195 | Cupery et al. | Mar. 29, 1955 |
| 2,709,648 | Ryker et al. | May 31, 1955 |
| 2,723,192 | Todd | Nov. 8, 1955 |
| 2,726,150 | Wolter | Dec. 6, 1955 |
| 2,782,112 | Gilbert et al. | Feb. 19, 1957 |

OTHER REFERENCES

Petersen et al.; in "Chemical Abstracts," vol. 43, columns 168 and 169, 1949.